July 18, 1939.   A. C. LINDGREN ET AL   2,166,416
THRESHER
Filed Dec. 24, 1936   2 Sheets-Sheet 1

Inventors
Alexus C. Lindgren
and Clemma R. Raney
By V. F. Lavagna
Atty.

July 18, 1939.  A. C. LINDGREN ET AL  2,166,416
THRESHER
Filed Dec. 24, 1936  2 Sheets-Sheet 2

Inventors
Alexus C. Lindgren
and Clemma R. Raney
By /.F. Lavagne
Atty.

Patented July 18, 1939

2,166,416

UNITED STATES PATENT OFFICE 2,166,416

THRESHER

Alexus C. Lindgren, Chicago, and Clemma R. Raney, Riverside, Ill., assignors to International Harvester Company, a corporation of New Jersey Application December 24, 1936, Serial No. 117,434

4 Claims. (Cl. 130—27)

The invention relates to threshers and particularly to that portion of the thresher embodying the organization of the threshing cylinder, concave, and a grain carrier disposed below the concave.

The novel organization comprising this invention is herein disclosed in connection with a harvester thresher, although it is to be understood that the same structure may also be used in a stationary thresher.

It is desired that, in a thresher organization as above described, the concave be made accessible for adjustment and inspection. Further, it is desirable that the organization be as compact as possible to make for good balance in the construction of the thresher.

In organizations of this kind it has been found that, where a grain carrier is disposed below the concave to carry the shelled grain from therebeneath to a point rearwardly of the concave, difficulty is encountered in getting at the concave to inspect and adjust and reconstruct the same for various conditions of grain to be handled by the thresher. It is desirable, therefore, that means be provided whereby the concave can be made readily accessible for whatever purpose desired.

The main object of the invention, therefore, is to provide an improved, compact assemblage and relative location of parts comprising the cylinder, concave, and a grain carrier.

Another object of the invention is to provide a simple means whereby the concave may be made readily accessible.

Still another object is to provide means in a thresher structure of the type described whereby the concave can be made readily accessible from a point below the grain carrier.

Still another object is to provide means whereby that portion of the grain carrier disposed beneath the concave may be swung to a position out of the way, to provide a free space for a workman to get into to perform necessary work on the concave.

Still another object of the invention is to provide a compact assemblage of thresher parts as described, in which the axle that carries the thresher is passed through the grain carrier.

Other important objects will become apparent to those skilled in this art as the disclosure is more fully made.

In the accompanying sheets of drawings there has been illustrated a thresher of the harvester thresher type in which the body or housing of the thresher carries a cylinder of the rub bar type, beneath which is disposed a concave, and below the concave is a grain carrier to receive threshed grain falling through the concave and to move it from below the concave rearwardly and upwardly into the separator of the thresher disposed rearwardly of the cylinder. A cover plate beneath the forward end of the grain carrier is bodily removable to expose certain fastening means, which may be disconnected to permit the forward end of the grain carrier to be hingedly dropped, whereby to make the concave accessible to an operator from a point beneath the body. Further, in this organization, the transverse wheel supported axle, which carries the thresher, is passed through the grain carrier above mentioned, which latter is of the endless type, thus making for a compact assemblage of parts.

Figure 3:
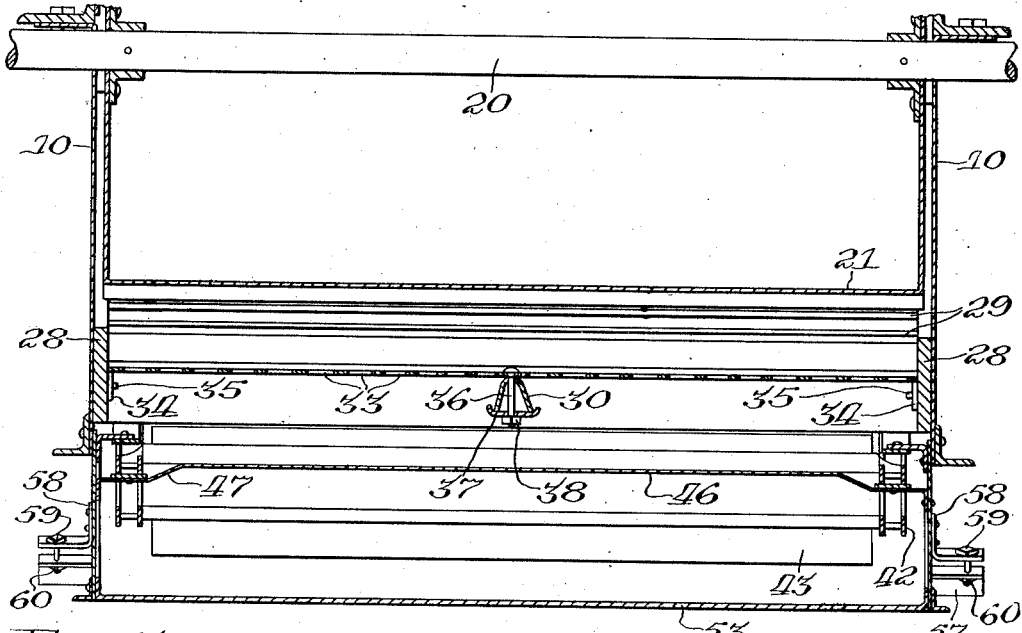
Figure 3 is a transverse cross-sectional view through the thresher structure, taken along the line 3—3 of Figure 2, looking in the direction of the arrows; and, Figure 4 is a fragmentary detail sectional view taken along the line 4—4 of Figure 2, looking in the direction of the arrows.

The harvester thresher herein shown comprises the usual body 10, which at opposite sides carries depending brackets 11, in which is mounted a transverse axle 12 carried in the usual supporting wheels 13, only one of which is shown. Said brackets 11, of course, are in transverse alignment and the lower ends are notched and cross-tied by a transverse tie rod 14, as is usual in these threshers.

At the lower, forward end of said housing 10 is a transverse angle bar frame member 15, and disposed forwardly of the housing 10 is a feeder housing 16, in which housing 16 is carried a transverse roller 17 on a shaft 18 for an endless feeder conveyer 19. This feeder structure is the usual one employed in threshers for feeding grain into the body 10 where it is to be treated by the threshing mechanism now to be described.

Figure 1:
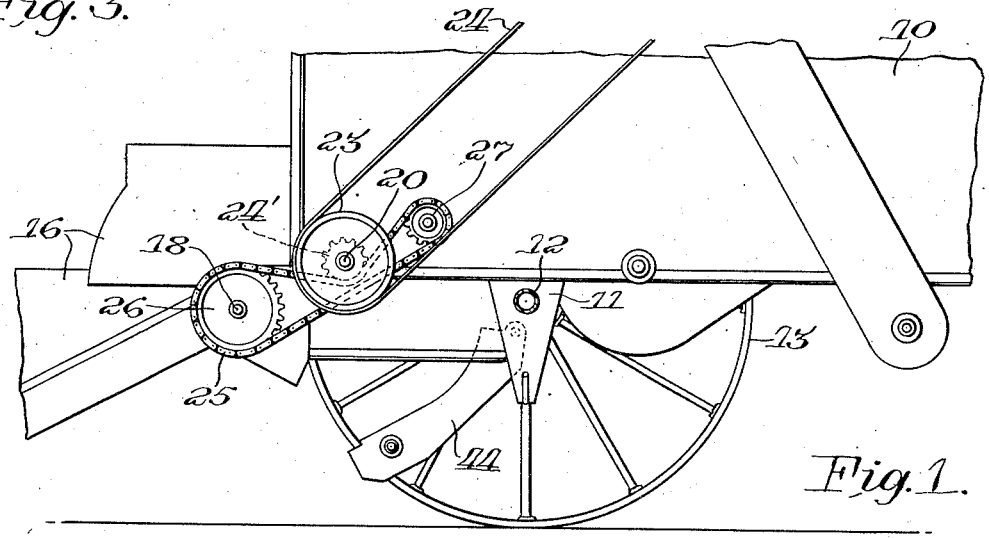
Figure 1 is a general side elevational view looking from the stubbleward side of so much of a harvester thresher as is necessary to disclose the present invention.
Figure 2:
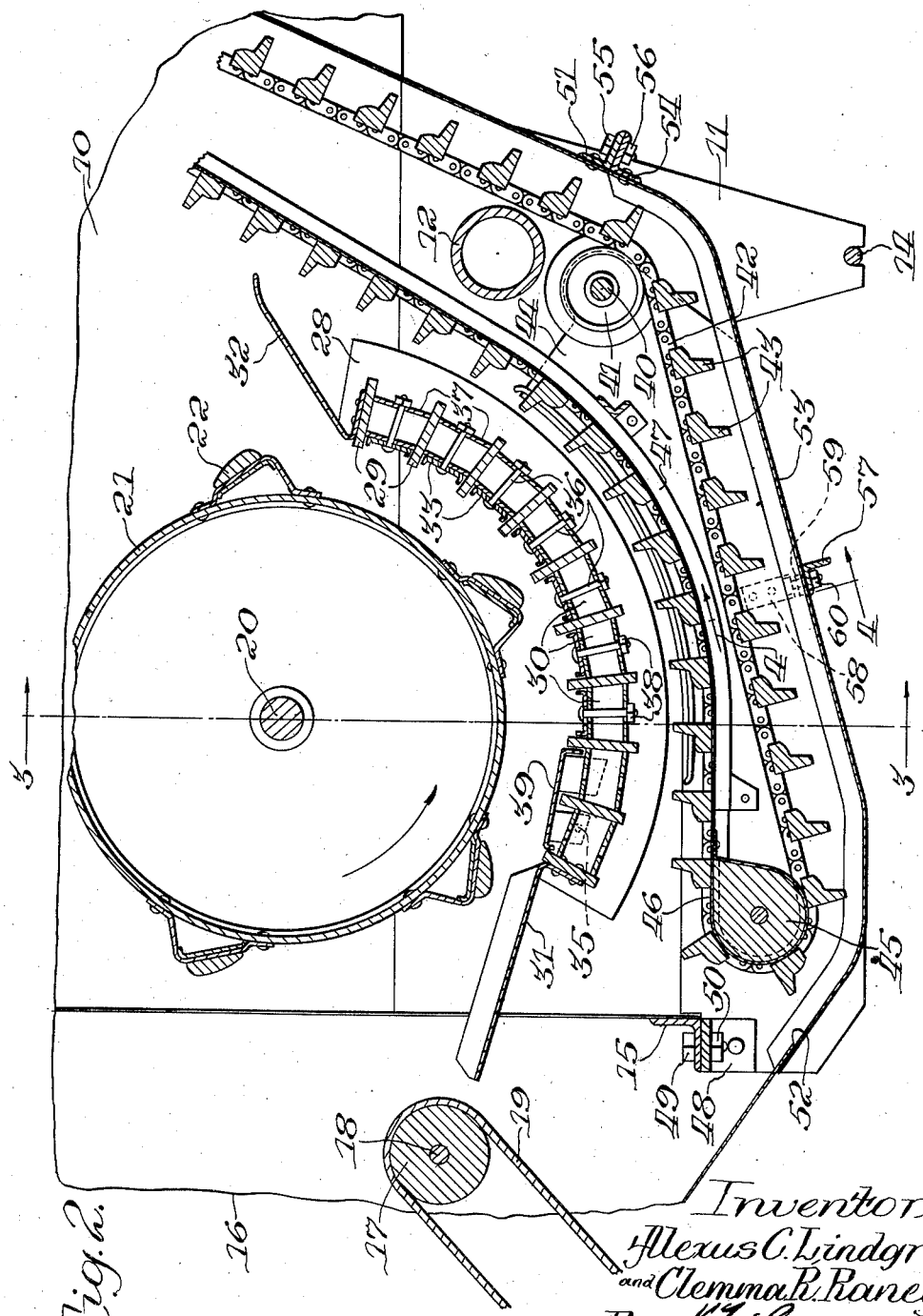
Figure 2 is a central longitudinal, sectional view on an enlarged scale of so much of the thresher as is shown in Figure 1.

Appropriately journaled in the opposite side walls of the housing 10 is a transverse cylinder shaft 20, which, inside the body 10, carries a threshing cylinder in the form of a drum 21, on the periphery of which at spaced intervals are carried rub bars 22. The type of cylinder herein shown is purely illustrative, for obviously one of the spike toothed type could be used in place of the rub bar type herein shown. This cylinder shaft 20 extends out of the stubbleward side of the body 10 where it carries a pulley 23 turned by a belt 24 from an engine or other suitable source of power, not shown, to drive the cylinder 21 in a counter-clockwise direction, as indicated in Figure 2, and as indicated by the arrow therein appearing. Further, this shaft 20 carries adjacent the pulley wheel 23 a sprocket wheel 24' to drive a chain 25, which in turn drives a sprocket wheel 26 on the shaft 18 to drive the conveyer 19. The chain is then wrapped around an idler sprocket 27 carried on the side wall of the body 10, as indicated in Figure 1. The concave structure for the cylinder will next be described.

Below the threshing cylinder 24 is disposed an arcuate concave structure, which, as shown in Figures 2 and 3, comprises arcuate end plates 28 appropriately made fast in the body 10, and, at angularly spaced intervals, said side plates 28 carry grate bars 29 radially disposed relative to the axis of rotation of the threshing cylinder 21. Along the median line of these transverse bars 29 the spaces between adjacent bars are provided with an inverted channel-shaped spacer 30, said spacers being welded to the adjacent grate bars 29 for securely unifying them into an integral structure. The forward end of this concave is provided with an apron 31 to receive material discharged by the feeder 19, so that the material will be passed between the threshing cylinder 21 and the concave to be threshed by the cooperative action of the rub bars 22 and the projecting edges of the grate bars 29 along the inner diameter of the concave structure. The rear end of the concave structure carries an apron 32, over which the straw handled will pass rearwardly into the separator part of the machine for further treatment. This concave structure in the spaces between its grate bars 29 is adapted to be provided with fillers or insert members to fit the concave for threshing various materials, such as wheat and other small grains and soy beans, and the like. Such inserts are shown in Figures 2 and 3, where it will be seen that they are in the nature of strips 33 having a bent end 34 provided with a hole adapted to fit over a pin 35 carried in the side plates 28 in each of the spaces between the grate bars 29. Each insert is of a length equal to half the width of the concave, so that the inner end of each insert 33 is in a position to overlie and rest on the median spacer 30 in each grate bar space. Thus, in each space two inserts 33 will be arranged end to end with the inner ends resting on the spacer 30, where a bolt 36 is provided with a head to clamp the inner ends of the inserts 33 against the spacer 30. This bolt 36 also passes through a washer 37, and a nut 38 for the bolt 36 is disposed below the washer 37, as shown in Figure 3. These inserts 33 may take various forms, depending upon the character of the material to be threshed. For instance, these inserts 33 may be perforated to let the threshed seeds fall therethrough, or some of them may be imperforate, as for example, the insert shown at 39 in Figure 2, to provide a blank surface to reduce the threshing action by blocking out certain of the grate bars 29. In other words, it should be plain now that, to fit various kinds of crops to be threshed, it becomes necessary to reconstruct the concave by bringing into play different kinds and combinations of these insert members, thereby adjusting the concave to different conditions and kinds of seed to be handled.

At a point below and just forwardly of the axle 12 is a transverse shaft 40 carrying a roller 41, about which is trained an endless chain conveyer 42 including lag bars 43. This endless conveyer extends upwardly and rearwardly behind the concave and, it will be noted, the vehicle axle 12 passes therethrough, by which is meant that the axle is disposed between the runs of this conveyer, which is herein known as the grain carrier, for carrying threshed grain from beneath the concave to a point in the machine rearwardly of the threshing cylinder.

Enveloping the ends of the roller 41 are respective side plates 44, the shape of which is delineated in Figures 1 and 2, with the forward ends thereof carrying blocks 45, around which is wrapped a table or tight bottom 46, over which the top run of the grain carrier drags, said table being supported at its sides by bent flanges 47. It can now be seen that the grain carrier, at its forward end, is disposed beneath the concave to receive grain falling therethrough and to move it rearwardly and upwardly from underneath and behind the concave to a point in the thresher body rearwardly of the threshing cylinder 21. The side plates 44 heretofore mentioned extend forwardly to a point adjacent the transverse frame angle bar 15 where the forward ends of said respective side plates 44 carry an angle bracket 48 adapted to lie flatly against the under side of the angle bar 15, so that, by means of a bolt 49 having a nut 50 on the under side of the horizontal flange of the bracket 48, the forward ends of said side plates 44 may be securely connected at their forward ends to said transverse frame angle bar 15. In this manner, the forward end of the grain carrier is held in its normal operative position in relation to the concave, as shown in Figure 2.

The body of the thresher, at a point behind and below the axle 12, carries a transverse exterior angle bar 51 and from this angle bar 51 forwardly to a point below the angle bar 15 the housing is open, as indicated at 52. This opening is closable by means of a bottom plate 53, the rear end of which carries an angle bar 54 complementary to the angle bar 51, so that, by means of a bolt 55 and a nut 56, the rear edge of said bottom plate or pan 53 may be securely connected to the frame piece 51. The forward edge of said pan 53 merely rests against the under side of a portion of the feeder housing 16, as shown in Figure 2, but intermediate the front and rear ends of said bottom pan 53 is provided an additional securing means, which will now be described.

Figure 4:
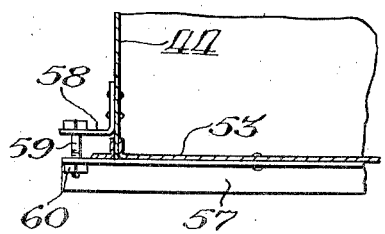

Transversely disposed underneath the pan and securely riveted thereto, as indicated in Figure 4, is a transverse angle bar 57, which, as shown in Figure 4, extends beyond the sides of the plates 44. Above these outwardly extending ends of the angle bar 57 the side plates 44 respectively carry an angle bracket 58 overlying said extended ends of the angle bar 57, so that a bolt 59 may be dropped through the brackets 58 and angle bar 57 at each side of the structure, and, by means of nuts 60, the parts can be connected together to provide the said intermediate support for the bottom pan 53. This completes the detailed description of the structure, and the mode of operation and manner of use of this improved structure will next be described.

The feeder 19 feeds the material to be threshed to a point where it can be taken by the cylinder in the space between the cylinder 21 and the concave structure 29 over the apron 31. The cooperating action between the rub bars 22 and the inner diameter edges of the grate bars 29 serves to thresh seeds from the straws. Such seeds pass through the perforated insert members 33 in the grate bar spaces and drop downwardly onto the grain carrier 42, where the bars 43 thereof drag the seeds rearwardly and upwardly over the table or tight bottom 46 in the manner heretofore described. This carrier embraces the vehicle axle 12, or, in another aspect, the axle 12 is passed through the grain carrier, thus making for a very compact assemblage of parts.

When it is desired to get at the concave structure for the purpose of reconstructing it by utilizing other inserts 33 than those that may be in place, the nuts 56 and 60 at opposite sides of the housing are removed, thus making it possible to drop bodily as a detached member the bottom pan 53, thus exposing the lower run of the grain carrier 42. By removing the nuts 50 on opposite ends of the transverse frame member 15, it is possible to drop by gravity the forward end of the grain carrier with its carrier plate structure 44, which hinges as a unit about the axis of the shaft 40, as indicated in Figure 1, where the unit is shown dropped, it being understood in this figure that the bottom pan 53 has previously been removed. With the forward end of the grain carrier thus dropped, the concave structure immediately is accessible to a worker standing on the ground, who can get his head and shoulders, and hands up into the opening thus provided to get at the nuts 38 and inserts 33 for reconstructing the concave. When the reconstruction of the concave has been completed, the reverse steps are effected to bring the parts removed back into their normal operative positions, as shown in Figure 2, for further operation of the machine.

It can now be seen that an improved thresher structure has been provided, which achieves all of the desirable objects of the invention as heretofore recited.

It is the intention to cover all changes and modifications of the illustrative embodiment herein shown which do not in material respects depart from the spirit and scope of the invention, which is defined in the appended claims.

What is claimed is:

1. A foldable grain carrier for a harvester thresher having a housing containing and carrying a cylinder and a concave therebelow, said carrier comprising a conveyer having spaced runs with an intermediate portion of one run trained about a pair of sprockets disposed on a shaft parallel to and at the rear of the cylinder, a frame carried on said shaft and extending forwardly below the cylinder and concave and detachably secured adjacent its forward end to a portion of the housing, a second shaft carried by the frame adjacent its forward end and parallel to the first shaft, said shaft carrying a pair of sprockets thereon, said conveyer extending forwardly in alinement with the frame and being trained about said sprockets, whereby the forward end of the frame may be detached from the housing and swung downwardly about the first shaft as a pivot, together with the aforesaid portion of the conveyer thereon to expose the concave and the cylinder.

2. A foldable grain carrier and cover structure for a harvester thresher having a housing containing and carrying a cylinder and a concave therebelow, a bottom portion of the housing having a substantially rectangular opening adjacent the cylinder and concave, said carrier comprising a conveyer having spaced runs with an intermediate portion of one run trained about a pair of sprockets disposed on a shaft parallel to the cylinder and in close proximity to the rear end of the opening, a frame carried on said shaft and extending forwardly below the cylinder and concave and terminating in close proximity to the forward end of the opening, and being detachably secured adjacent its forward end to a portion of the housing, a second shaft carried by the frame adjacent its forward end and parallel to the first shaft, said shaft carrying a pair of sprockets thereon, said conveyer extending forwardly in alinement with the frame and being trained about said sprockets, the forwardly extending portion of the conveyer being substantially coextensive with the aforesaid opening, the cover structure comprising a sheet metal cover plate secured to the housing over the opening to enclose the aforesaid parts, said cover being removable from the housing, whereby the forward end of the frame may be detached from the housing and swung downwardly through the opening about the first shaft as a pivot, together with the aforesaid portion of the conveyer thereon to expose the concave and the cylinder.

3. A foldable grain carrier for a thresher having a housing containing and carrying a cylinder and concave therebelow, said grain carrier comprising a conveyer having spaced runs extending substantially downwardly at the rear of the cylinder, a transverse shaft disposed in the housing parallel to and at the rear of and below the cylinder, a pair of sprockets carried by the shaft, a frame carried on the shaft and extending substantially horizontally forwardly below the cylinder and concave, the frame at its forward end being detachably connected to a portion of the thresher housing, a second shaft carried by the frame adjacent its forward end, being disposed parallel to the first shaft and having a pair of sprockets thereon, one run of the conveyer being trained about the sprockets on the first shaft and extending forwardly in alinement with the frame and trained about the sprockets on the second shaft, a substantially tight bottom carried by the frame and extending rearwardly from a point adjacent the second shaft toward the first shaft and upwardly from the latter, the upper run of the conveyer extending rearwardly and upwardly in alinement with this bottom, the horizontally extending portion of the conveyer together with the bottom and the frame being thereby permitted to swing downwardly about the first shaft as a pivot when the forward end of the frame is detached from the housing.

4. In a thresher, a longitudinal body, a wheel carried axle supporting said body, a cylinder and concave in the body, and an endless grain carrier comprising spaced runs extending downwardly at the rear of the cylinder, a transverse shaft carried by the housing parallel to and closely adjacent the aforesaid axle and including sprockets thereon, a frame carried by said shaft and extending forwardly therefrom to a point at the forward side of the cylinder and concave, said frame being detachably secured at its forward end to the housing, a second shaft carried by the frame substantially forwardly of and below the cylinder and concave and including sprockets thereon, the rearward run of the downwardly extending portion of the grain carrier passing rearwardly of and in close proximity to the axle and trained about the sprockets on the first shaft, a forward portion of the carrier extending substantially horizontally forwardly and being trained about the sprockets on the second shaft, the upper run of the carrier extending rearwardly and upwardly at the forward side of and in close proximity to the axle, the forwardly extending portions of the carrier being thereby adapted to swing downwardly with the frame about the first shaft as a pivot when the forward end of the frame is detached from the housing.

ALEXUS C. LINDGREN.
CLEMMA R. RANEY.